(12) United States Patent
Sun et al.

(10) Patent No.: US 8,828,545 B2
(45) Date of Patent: Sep. 9, 2014

(54) GLASS SUITABLE FOR CHEMICAL TEMPERING AND CHEMICALLY TEMPERED GLASS THEREOF

(75) Inventors: Wei Sun, LongQuan (CN); Chuncai Song, LongQuan (CN); Xiaoli Chen, LongQuan (CN); Ning Chen, LongQuan (CN); Jun Xiao, LongQuan (CN); Chang Li, LongQuan (CN)

(73) Assignee: CDGM Glass Co., Ltd., Chengdu (CN)

( * ) Notice: Subject to any disclaimer, the term of this patent is extended or adjusted under 35 U.S.C. 154(b) by 214 days.

(21) Appl. No.: 13/258,939

(22) PCT Filed: Jul. 16, 2009

(86) PCT No.: PCT/CN2009/072787
§ 371 (c)(1),
(2), (4) Date: Sep. 22, 2011

(87) PCT Pub. No.: WO2010/111850
PCT Pub. Date: Oct. 7, 2010

(65) Prior Publication Data
US 2012/0015197 A1 Jan. 19, 2012

(30) Foreign Application Priority Data
Mar. 31, 2009 (CN) .......................... 2009 1 0301240

(51) Int. Cl.
C03C 3/091 (2006.01)
C03C 3/093 (2006.01)
C03C 21/00 (2006.01)
C03C 23/00 (2006.01)

(52) U.S. Cl.
CPC .................. C03C 3/091 (2013.01); C03C 3/093 (2013.01); C03C 23/007 (2013.01)
USPC .................. 428/410; 501/66; 501/67; 501/70; 428/426

(58) Field of Classification Search
USPC ............. 501/66, 67, 68, 69, 70; 428/410, 426
See application file for complete search history.

(56) References Cited

U.S. PATENT DOCUMENTS

| 3,772,135 A | 11/1973 | Hara et al. | |
|---|---|---|---|
| 7,396,788 B2 * | 7/2008 | Kawai et al. | 501/66 |
| 7,666,511 B2 * | 2/2010 | Ellison et al. | 428/426 |
| 8,158,543 B2 * | 4/2012 | Dejneka et al. | 501/68 |
| 8,349,454 B2 * | 1/2013 | Murata et al. | 428/410 |
| 2008/0020919 A1 * | 1/2008 | Murata | 501/66 |
| 2009/0142568 A1 * | 6/2009 | Dejneka et al. | 428/220 |
| 2009/0197088 A1 * | 8/2009 | Murata | 428/410 |
| 2010/0035745 A1 * | 2/2010 | Murata | 501/66 |

FOREIGN PATENT DOCUMENTS

| CN | 1886348 | 12/2006 |
|---|---|---|
| CN | 101337770 | 1/2009 |
| WO | WO 2008044694 A1 * | 4/2008 |
| WO | WO 2008149858 A1 * | 12/2008 |
| WO | WO 2009019965 A1 * | 2/2009 |

OTHER PUBLICATIONS

International Search Report for international application No. PCT/CN2009/072787, dated Jan. 7, 2010 (6 pages).

* cited by examiner

*Primary Examiner* — Karl Group
*Assistant Examiner* — Elizabeth A Bolden
(74) *Attorney, Agent, or Firm* — Hamre, Schumann, Mueller & Larson, P.C.

(57) ABSTRACT

The invention provides a silica-alumina-sodium oxide glass easy to melt and suitable for a low temperature ion exchange process. The glass is suitable for chemical tempering and consists of 55-60 wt % of $SiO_2$, 0.1-2.5 wt % of $B_2O_3$, 11-16 wt % of $Al_2O_3$, 14-17 wt % of $Na_2O$, 1-8 wt % of $K_2O$, 0-8 wt % of $ZrO_2$, 0-5 wt % of CaO, 0-5 wt % of MgO and 0-1 wt % of $Sb_2O_3$. By reasonably setting the composition, the difficulty in glass production decreases and the glass melting temperature is reduced obviously, which is favorable to reduce energy consumption and improve yield of products. Under the condition that tempering temperature is 380□-500□ and tempering time is 4-12 h, the surface compressive stress can be 610-1100 Mpa, the depth of a stress layer can be 31-80 μm, and the glass is reinforced and has high shock resistance. The glass of the invention has high wear resistance and can be used as a protective glass material of high-grade electronic display products such as mobile phones and PDAs.

19 Claims, No Drawings

GLASS SUITABLE FOR CHEMICAL TEMPERING AND CHEMICALLY TEMPERED GLASS THEREOF

FIELD OF THE INVENTION

The invention relates to a glass suitable for chemical tempering and a chemically tempered glass thereof.

DESCRIPTION OF THE RELATED ART

In the process of glass manufacturing, processing and use, a large number of microcracks generate on the surface so that the actual strength of the glass is much lower than theoretical strength. As a rule, thermal tempering or chemical tempering is needed to produce compressive stress on the glass surface so as to improve the glass strength and prevent the microcracks on the glass surface from expanding.

Chemical tempering of the glass means a process in which heated alkali-containing glass is immersed into molten salt bath to change chemical composition of the glass surface through ion exchange between the glass and molten salt, and form a compressive stress layer on the glass surface so as to achieve the aim of enhancing the glass strength. At present, there are two types of ion exchange tempering. The first one is high temperature treatment process in which ions with smaller radius in the molten salt replace ions with bigger radius in glass at the temperature above glass transition temperature to form a thin layer with thermal expansion coefficient lower than that of the main glass on the glass surface. When the thin layer is cooled, compressive stress generates on the glass surface, which depends on the difference in the thermal expansion coefficients therebetween. The second is low temperature treatment process mainly performed under strain point of the glass, in which ions with bigger radius (K+) in the molten salt replace ions (Na+) with smaller radius in the glass to extrude the glass surface so as to produce a compressive stress layer, the stress value of which depends on bulk effect of the ions exchanged.

The second ion exchange tempering process means that external bigger ions are used to replace smaller ions in the glass to produce surface compression. Typically, glass of a lithium aluminosilicate or sodium-aluminium-silicon system exchanges ions with potassium nitrate molten salt. After the chemical tempering, the glass of lithium aluminosilicate system can obtain satisfactory compressive stress value, but which occurs only when depth of the compressive stress layer is a few microns. As the exchange layer thickens, stress is released constantly, the compressive stress value decreases obviously, which can bring out obvious disadvantages in use of the glass, that is, an excessively thin compressive stress layer may be abraded or scratched.

A chemical tempering method of using potassium ions to replace sodium ions in the glass of sodium-aluminum-silicon system for producing the surface compression has been studied. Glass 0317 manufactured by Corning Incorporated is produced by said method, which has excellent performance. However, it is difficult to be manufactured due to excessively high melting temperature (1600° C.). CN101337770A also discloses a chemically tempered glass which is obtained by chemical tempering a glass sample at 490° C. for 3-8 h, Vickers hardness of the tempered glass can be 638 MPa after the tempering. However, since the glass composition comprises a large amount of $Al_2O_3$ which has high melting point, glass viscosity increases and it is difficult to eliminate bubbles. Thus $Sb_2O_3$, $SO_3$, $As_2O_3$ and fluoride must be added during melting to obtain efficient clarification effect. It is different to implement the product manufacturing process.

SUMMARY OF THE INVENTION

The technical problem to be solved by the invention is to provide a silica-alumina-sodium oxide glass suitable for low temperature ion exchange process and easy to melt. At a relatively low tempering temperature and within a relatively short tempering time, the glass can obtain a deeper stress layer, as well as higher compressive stress.

The technical solution for solving the technical problem in the invention is a glass suitable for chemical tempering which consists of 55-60 wt % of $SiO_2$, 0.1-2.5 wt % of $B_2O_3$, 11-16 wt % of $Al_2O_3$, 14-17 wt % of $Na_2O$, 1-8 wt % of $K_2O$, 0-8 wt % of $ZrO_2$, 0-5 wt % of CaO, 0-5 wt % of MgO and 0-1 wt % of $Sb_2O_3$.

Further, the glass has a melting temperature of 1400° C.-1550° C., a resistance to acid more than grade 1 and a resistance to humidity better than class B.

Further, the glass contains 12-15 wt % of $Al_2O_3$.

Further, the glass contains 15.1-17 wt % of $Na_2O$.

Further, the glass contains 12-15 wt % of $Al_2O_3$ and 15.1-17 wt % of $Na_2O$.

Further, the glass consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO and 0-1 wt % of $Sb_2O_3$.

Further, the glass consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO and 0-0.8 wt % of $Sb_2O_3$.

A glass suitable for chemical tempering has a surface compressive stress of 610-1100 MPa and a depth of a stress layer of 31-80 μm, under the conditions that tempering temperature is 380° C.-500° C. and tempering time is 4-12 h.

Further, the glass consists of 55-60 wt % of $SiO_2$, 0.1-2.5 wt % of $B_2O_3$, 11-16 wt % of $Al_2O_3$, 14-17 wt % of $Na_2O$, 1-8 wt % of $K_2O$, 0-8 wt % of $ZrO_2$, 0-5 wt % of CaO, 0-5 wt % of MgO and 0-1 wt % of $Sb_2O_3$.

Further, the glass has a melting temperature of 1400□-1550□, a resistance to acid more than grade 1 and a resistance to humidity better than class B.

Further, the glass contains 12-15 wt % of $Al_2O_3$.

Further, the glass contains 15.1-17 wt % of $Na_2O$.

Further, the glass contains 12-15 wt % of $Al_2O_3$ and 15.1-17 wt % of $Na_2O$.

Further, the glass consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO and 0-1 wt % of $Sb_2O_3$.

Further, the glass consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO and 0-0.8 wt % of $Sb_2O_3$.

A chemically tempered glass having depth of a hardened layer and a tensile stress area, is characterized in that the glass in the tensile stress area consists of 55-60 wt % of $SiO_2$, 0.1-2.5 wt % of $B_2O_3$, 11-16 wt % of $Al_2O_3$, 14-17 wt % of $Na_2O$, 1-8 wt % of $K_2O$, 0-8 wt % of $ZrO_2$, 0-5 wt % of CaO, 0-5 wt % of MgO and 0-1 wt % of $Sb_2O_3$.

Further, the glass has a melting temperature of 1400□-1550□, a resistance to acid more than grade 1 and a resistance to humidity better than class B.

Further, the glass contains 12-15 wt % of $Al_2O_3$.

Further, the glass contains 15.1-17 wt % of $Na_2O$.

Further, the glass contains 12-15 wt % of $Al_2O_3$ and 15.1-17 wt % of $Na_2O$.

Further, the glass in the tensile stress area consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO and $Sb_2O_3$ of 0-1 wt %.

Further, the glass in the tensile stress area consists of 55-60 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO and 0-0.8 wt % of $Sb_2O_3$.

A mobile phone panel made of the chemically tempered glass.

A PDA panel made of the chemically tempered glass.

The invention has the following advantages: by reasonably adjusting the composition of present glass containing silica-alumina-sodium oxide, the difficulty in glass production decreases and the glass melting temperature is reduced obviously, which is favorable to reduce energy consumption and improve yield of products. Under the condition that the tempering temperature is 380° C.-500° C. and the tempering time is 4-12 h, the surface compressive stress of glass can be 610-1100 MPa, the depth of the stress layer can be 31-80 μm, and the glass is reinforced and has high shock resistance. The glass of the invention has high wear resistance and can be used as a protective glass material of high-grade electronic display products such as mobile phones and PDAs.

DETAILED DESCRIPTION OF THE PREFERRED EMBODIMENTS

The components that may be contained in the glass of the invention are described below, and content of each component is expressed in wt %.

$SiO_2$ is a main component for forming a glass frame. The more the content of $SiO_2$ is, the higher the chemical durability and mechanical strength are. If content of $SiO_2$ is less than 55 wt %, the glass may have poor chemical stability. If the content of $SiO_2$ is more than 60 wt %, the melting temperature is excessively high. Therefore, the content of $SiO_2$ is limited to 55-60 wt %.

$B_2O_3$ is an essential component for improving glass meltability and decreasing viscosity. Excessive $B_2O_3$ can decrease ion exchange rate of the glass. Therefore, content thereof is limited to 0.1-2.5 wt %, and preferably 0.1-1.7 wt %.

$Al_2O_3$ facilitates ion exchanging on the glass surface and is an essential component for improving chemical stability, reducing recrystallization tendency and increasing hardness and mechanical strength. If content of $Al_2O_3$ is less than 11 wt %, exchange effect and chemical stability of the glass are poor. If the content of $Al_2O_3$ is more than 16 wt %, glass viscosity increases and devitrification resistance deteriorates. Therefore, the content of $Al_2O_3$ is 11-16 wt %, and more preferably 12-15 wt %.

Aluminosilicate glass contains a large mount of intermediate oxide $Al_2O_3$. In case of more alkali metal, aluminum in the glass exists in the form of tetrahedron, which has greater volume than silica tetrahedron and results in larger voids to facilitate ion exchange on the glass surface. The larger exchange depth is also obtained, which is beneficial to inhibiting scratches and impact fractures, and improving mechanical strength obviously.

As an essential component facilitating K ion exchange between the glass surface and ion exchange treatment liquid so as to realize the chemical tempering of the glass, $Na_2O$ is also a glass component which is easy to melt and capable of decreasing the melting temperature of the glass. If content thereof is less than 14 wt %, devitrification resistance deteriorates; but if the content is more than 17 wt %, chemical stability is degraded and hardness decreases. Therefore, the content of $Na_2O$ is limited to 14-17 wt %, and more preferably 15.1-17 wt %.

The combination usage of $K_2O$ and $Na_2O$ can increase glass meltability and decrease glass viscosity. Therefore, the content of $Na_2O+K_2O$ is limited to 15-25 wt %. The content of $K_2O$ is limited to 1-8 wt %, and more preferably 2-6 wt %.

$ZrO_2$ can improve hardness of the glass. If content thereof is less than 5 wt %, chemical stability can be improved. If the content is more than 5 wt %, the devitrification resistance of the glass deteriorates and the glass can easily form undissolved matter at the bottom of a melter and intend to settle. Therefore, the content of $ZrO_2$ is limited to 0-8 wt %, preferably 0-5 wt %, and more preferably 1-4 wt %.

As alkaline earth glass components, MgO, CaO, SrO and BaO can stabilize the glass and prevent crystallization of the glass, and also effectively inhibit movement of alkali in the glass.

MgO also has the effect of improving tensile modulus of elasticity of the glass and is a main source of alkaline earth metal. The content thereof is 0-5 wt %, and preferably 1-3 wt %.

CaO functions the same as MgO, and the content thereof is 0-5 wt %. When the content of CaO is more than 1 wt %, the glass becomes stable. Therefore, the content of CaO is preferably 1-3 wt %.

BaO and SrO also can stabilize the glass and inhibit recrystallization of the glass, and the combined content is 0-2 wt %.

In the invention, $Sb_2O_3$ is used as a clarifier. The content of $Sb_2O_3$ is 0-1 wt %, and preferably 0-0.8 wt %.

A process for producing the glass of the invention is as follows:

1) weighing common raw materials such as oxide, carbonate and nitrate of each component based on weight percentage, thoroughly mixing and putting into a platinum crucible;

2) melting the materials at 1400° C.-1550° C., refining, homogenizing, and then cooling;

3) injecting molten glass into a preheated metal mold, and putting the glass together with the metal mold into an annealing furnace for annealing and cooling to obtain the glass.

The glass of the invention is processed into the size of 50×50×1 mm and subject to ion exchange treatment in $KNO_3$ molten salt at 380° C.-500° C. After tempering and soaking for 4-12 h, Na ions on the glass surface are exchanged with K ions in the molten salt to obtain a chemically tempered glass.

The chemically tempered glass has hardened layer depth and a tensile stress area, in which the hardened layer depth refers to a distance from surface of the chemically tempered glass to a position at which internal compressive stress of the glass is zero, The glass therein is called as "glass in compression area". The tensile stress area refers to internal glass where internal depth of the glass is greater than the depth of the hardened layer, that is, the glass other than the "glass in compression area" is called as "glass in the tensile stress area". The "glass in compression area" and the "glass in the tensile stress area" have different components as sodium ions in the "glass in compression area" are more than those in the "glass in the tensile stress area".

The surface compressive stress of the glass and the depth of the stress layer are determined by a FSM-6000 stress gauge. Tempered glass samples (50×50×1 mm) are wiped and placed on a glass test bench coated with refractive liquid (refractive index of the refractive liquid is more than 1.64). The FSM-6000 measures the surface compressive stress and the depth of the stress layer through optical waveguide effect of a surface layer of the tempered samples.

Tempered glass samples (50×50×1 mm) are placed on a test bench and taken out after being compressed by a drill for a certain time. Then, length of a compression mark is measured to determine Vickers hardness of the glass.

Transition temperature and expansion coefficient are tested in accordance with GB/T7962.16-1987 Colourless Optical Glass Test Methods—Linear Thermal Expansion Coefficient and Transition temperature.

Resistance to acid of the glass is tested in accordance with GB/T7962.14-1987 Colourless Optical Glass Test Methods—Resistance to Acid.

Humidity resistance of the glass is tested in accordance with GB/T7962.15-1987 Colourless Optical Glass Test Methods—Resistance to Humidity.

Table 1 and Table 2 show 10 examples of the invention.

TABLE 1

|  |  | 1 | 2 | 3 | 4 | 5 |
|---|---|---|---|---|---|---|
| Chemical composition of glass, wt % | $SiO_2$ | 59.2 | 58.5 | 57.4 | 56.6 | 55.0 |
|  | $B_2O_3$ |  | 1.5 | 1.5 | 2.0 | 2.5 |
|  | $Al_2O_3$ | 15.6 | 14.6 | 13.0 | 13.2 | 15.5 |
|  | $Na_2O$ | 16.2 | 16.0 | 15.2 | 15.2 | 16.3 |
|  | $ZrO_2$ |  |  | 3.5 | 3.5 | 3.0 |
|  | $K_2O$ | 4.5 | 3.4 | 5.3 | 5.3 | 5.5 |
|  | CaO |  | 1.5 | 1.9 |  |  |
|  | MgO | 4.0 | 3.8 | 1.8 | 4.0 | 1.5 |
|  | BaO |  |  |  |  |  |
|  | SrO |  |  |  |  | 0.5 |
|  | $Sb_2O_3$ | 0.5 | 0.7 | 0.4 | 0.2 | 0.2 |
| Chemical tempering time (h) |  | 8 | 5 | 8 | 8 | 11 |
| Chemical tempering temperature (° C.) |  | 420 | 500 | 480 | 500 | 450 |
| Stress after tempering (MPa) |  | 695 | 840 | 910 | 790 | 980 |
| Depth of stress layer after tempering (μm) |  | 40 | 55 | 52 | 68 | 45 |
| Vickers hardness, *$10^7$/Pa |  | 541 | 547 | 548 | 540 | 542 |
| Expansion coefficient, *$10^{-7}$/° C. |  | 94 | 105 | 100 | 110 | 90 |
| Resistance to acid |  | 1 | 1 | 1 | 1 | 1 |
| Resistance to humidity |  | B | B | B | B | B |

TABLE 2

|  |  | 6 | 7 | 8 | 9 | 10 |
|---|---|---|---|---|---|---|
| Chemical composition of glass, wt % | $SiO_2$ | 59.8 | 55.2 | 57.6 | 58.1 | 56.5 |
|  | $B_2O_3$ | 0.2 | 2.5 | 1.1 | 0.7 | 2.5 |
|  | $Al_2O_3$ | 15.8 | 11.3 | 13.5 | 14.9 | 13.8 |
|  | $Na_2O$ | 14.0 | 16.1 | 15.0 | 13.8 | 15.7 |
|  | $ZrO_2$ | 1.5 | 2.4 | 3.3 | 2.8 | 3.0 |
|  | $K_2O$ | 1.1 | 7.4 | 5.1 | 3.5 | 4.4 |
|  | CaO | 3.0 | 2.5 | 2.0 | 2.1 |  |
|  | MgO | 3.0 | 2.5 | 2.0 | 3.6 | 3.9 |
|  | BaO | 1 |  |  |  |  |
|  | SrO |  |  |  |  |  |
|  | $Sb_2O_3$ | 0.6 | 0.1 | 0.4 | 0.5 | 0.2 |
| Chemical tempering time (h) |  | 10 | 7 | 8 | 10 | 8 |
| Chemical tempering temperature (° C.) |  | 440 | 500 | 440 | 440 | 420 |
| Stress after tempering (MPa) |  | 630 | 790 | 650 | 1000 | 695 |
| Depth of stress layer after tempering (μm) |  | 49 | 69 | 49 | 37 | 39 |
| Vickers hardness, *$10^7$/Pa |  | 540 | 548 | 547 | 542 | 546 |
| Expansion coefficient, *$10^{-7}$/° C. |  | 114 | 110 | 100 | 105 | 107 |
| Resistance to acid |  | 1 | 1 | 1 | 1 | 1 |
| Resistance to humidity |  | B | B | B | B | B |

It can be obtained from the results of examples 1-10 that, after the low temperature ion exchange treatment, the glass of the invention has high ion exchange rate, the surface compressive stress thereof can be 610-1100 MPa, the ion exchange layer can be 31-80 μm, the resistance to acid and resistance to humidity are better than class 1 or grade B respectively, and weather ability of the glass is good.

The invention claimed is:

1. A glass suitable for chemical tempering, consisting of: 55-59.8 wt % of $SiO_2$, 0.1-2.5 wt % of $B_2O_3$, 11-16 wt % of $Al_2O_3$, 15.1-17 wt % of $Na_2O$, 1-8 wt % of $K_2O$, 0-8 wt % of $ZrO_2$, 0-5 wt % of CaO, 0-5 wt % of MgO and 0-1 wt % of $Sb_2O_3$.

2. The glass suitable for chemical tempering according to claim 1, wherein the glass has a melting temperature of 1400° C.-1550° C., a resistance to acid more than grade 1, and a resistance to humidity better than class B.

3. The glass suitable for chemical tempering according to claim 1, wherein the glass contains 12-15 wt % of $Al_2O_3$.

4. The glass suitable for chemical tempering according to claim 1, wherein the glass consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO, and 0-1 wt % of $Sb_2O_3$.

5. The glass suitable for chemical tempering according to claim 1, wherein the glass consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO, and 0-0.8 wt % of $Sb_2O_3$.

6. A glass suitable for chemical tempering, consisting of: 55-59.8 wt % of $SiO_2$, 0.1-2.5 wt % of $B_2O_3$, 11-16 wt % of $Al_2O_3$, 15.1-17 wt % of $Na_2O$, 1-8 wt % of $K_2O$, 0-8 wt % of $ZrO_2$, 0-5 wt % of CaO, 0-5 wt % of MgO, 0-2 wt % of BaO and SrO, and 0-1 wt % of $Sb_2O_3$,
wherein a surface compressive stress of the glass is 610-1100 MPa and a depth of a stress layer is 31-80 μm under the condition that tempering temperature is 380° C.-500° C. and tempering time is 4-12 h.

7. The glass suitable for chemical tempering according to claim 6, wherein the glass has a melting temperature of 1400° C.-1550° C., a resistance to acid more than grade 1, and a resistance to humidity better than class B.

8. The glass suitable for chemical tempering according to claim 6, wherein the glass contains 12-15 wt % of $Al_2O_3$.

9. The glass suitable for chemical tempering according to claim 6, wherein the glass consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO, and 0-1 wt % of $Sb_2O_3$.

10. The glass suitable for chemical tempering according to claim 6, wherein the glass consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO, and 0-0.8 wt % of $Sb_2O_3$.

11. A chemically tempered glass, comprising: a hardened layer depth and a tensile stress area, and the glass in the tensile stress area consisting essentially of 55-59.8 wt % of $SiO_2$, 0.1-2.5 wt % of $B_2O_3$, 11-16 wt % of $Al_2O_3$, 15.1-17 wt % of $Na_2O$, 1-8 wt % of $K_2O$, 0-8 wt % of $ZrO_2$, 0-5 wt % of CaO, 0-5 wt % of MgO, and 0-1 wt % of $Sb_2O_3$.

12. The chemically tempered glass according to claim 11, wherein the glass has a melting temperature of 1400° C.-1550° C., a resistance to acid more than grade 1, and a resistance to humidity better than class B.

13. The chemically tempered glass according to claim 11, wherein the glass contains 12-15 wt % of $Al_2O_3$.

14. The chemically tempered glass according to claim 11, wherein the glass in the tensile stress area consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 0-3 wt % of CaO, 0-3 wt % of MgO, and 0-1 wt % of $Sb_2O_3$.

15. The chemically tempered glass according to claim 11, wherein the glass in the tensile stress area consists of 55-59.8 wt % of $SiO_2$, 0.1-1.7 wt % of $B_2O_3$, 12-15 wt % of $Al_2O_3$, 15.1-17 wt % of $Na_2O$, 2-6 wt % of $K_2O$, 1-4 wt % of $ZrO_2$, 1-3 wt % of CaO, 1-3 wt % of MgO, and 0-0.8 wt % of $Sb_2O_3$.

16. A mobile phone panel made of the chemically tempered glass according to claim 11.

17. A PDA panel made of the chemically tempered glass according to claim 11.

18. A mobile phone panel made of the chemically tempered glass according to claim 12.

19. A PDA panel made of the chemically tempered glass according to claim 12.

* * * * *